United States Patent
Avila et al.

(10) Patent No.: US 6,250,537 B1
(45) Date of Patent: Jun. 26, 2001

(54) SELF-CLEANING SOLDERING THIMBLE ASSEMBLY

(75) Inventors: Miguel I. Avila; Oscar Vazquez, both of Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/519,113

(22) Filed: Mar. 6, 2000

(51) Int. Cl.⁷ .......................... B23K 31/00; B23K 31/02; B23K 3/06
(52) U.S. Cl. .................. 228/179.1; 228/56.1; 228/34; 228/259
(58) Field of Search .................... 228/34, 56.1, 179.1, 228/259

(56) References Cited

U.S. PATENT DOCUMENTS

| | | | |
|---|---|---|---|
| 4,509,670 | * 4/1985 | Cammarata | 228/34 |
| 4,666,077 | * 5/1987 | Rahn et al. | 228/37 |
| 5,087,356 | * 2/1992 | Webb | 210/143 |
| 5,192,014 | * 3/1993 | Ciniglio et al. | 228/34 |
| 5,330,801 | * 7/1994 | Monteiro et al. | 427/560 |
| 5,845,839 | * 12/1998 | Dodge et al. | 228/259 |
| 6,004,507 | * 12/1999 | Morando | 420/586 |

* cited by examiner

Primary Examiner—Tom Dunn
Assistant Examiner—L. Edmondson
(74) Attorney, Agent, or Firm—Margaret A. Dobrowitsky

(57) ABSTRACT

A self-cleaning soldering thimble assembly includes a thimble and a scraper disposed therein. The scraper is supported by two support rods that extend through the bottom of the thimble. The thimble slides along the support rods. When the thimble is dipped into a solder pot to refill the thimble with solder, the support rods abut the bottom of the solder pot, and the thimble continues to slide down the support rods causing the scraper to scrape away dross on the thimble.

8 Claims, 1 Drawing Sheet

SELF-CLEANING SOLDERING THIMBLE ASSEMBLY

TECHNICAL FIELD

The present invention relates to devices for soldering electrical connections.

BACKGROUND OF THE INVENTION

Many automotive control systems include component parts such as sensors and solenoids. Often, electrical connections in these sensors and solenoids are made by an automated soldering apparatus. In a common process, two or more insulated wires are dipped into a thimble filled with liquid solder to form an electrical connection and then removed.

The present invention recognizes that as the insulated wires are joined by this process, a portion of the insulating jacket nearest to the soldered connection melts and becomes a waste product that sticks to the thimble as the connected wires are removed. Over time, this waste product, commonly known as dross, accumulates along the upper edge of the thimble. The accumulated dross can decrease the quality of soldered connections and must be removed regularly to prevent failure of these connections.

The present invention understands that the dross may be removed manually after a predetermined number of soldering cycles. Unfortunately, manually removing the dross increases the down time of the soldering machine and as such, increases production costs. Moreover, manually removing the dross can increase the likelihood of injury to a machine operator from the toxic lead fumes emitted by the solder or from the high operating temperatures necessary to keep the solder molten.

The present invention has recognized these prior art drawbacks, and has provided the below-disclosed solutions to one or more of the prior art deficiencies.

SUMMARY OF THE INVENTION

A self-cleaning soldering thimble assembly includes a thimble having at least one side and a scraper closely spaced from the side such that it can scrape any dross on the side as it moves along the side. In a preferred embodiment, the thimble defines a top and the thimble is movable between an extended position, wherein the scraper is distanced from the top of the thimble, and a retracted position, wherein the scraper extends beyond the top of the thimble.

Also, in a preferred embodiment, the thimble defines a bottom and further includes at least one support rod attached to the scraper. The support rod extends through the bottom of the thimble and supports the scraper as the thimble moves relative to the scraper between the extended position and the retracted position. Preferably, the thimble assembly includes at least one support rod sleeve that is disposed around the support rod and at least one spring that is disposed around the support rod between the support rod sleeve and the thimble, the spring biasing the thimble toward the extended position.

A preferred embodiment of the present invention also includes at least one adjusting mechanism to adjust the height of the scraper relative to the thimble. Additionally, in a preferred embodiment, the thimble assembly includes a solder pot having a top and the thimble is movable between a partially submerged configuration, wherein the thimble is in the extended position and the thimble protrudes at least partially beyond the top of the solder pot, and a fully submerged configuration, wherein the thimble is in the retracted position and the thimble is disposed within the solder pot.

In another aspect of the present invention, a soldering apparatus includes a solder pot that defines a top, and a thimble is reciprocably disposed within the solder pot. The thimble defines a top and a scraper is disposed within the thimble. In this aspect of the present invention, the thimble is movable between an extended position, wherein the scraper is distanced from the top of the thimble, and a retracted position, wherein the scraper extends beyond the top of the thimble to scrape dross therefrom.

In yet another aspect of the present invention, a method for joining two electrical conductors with molten solder includes submerging a thimble in a solder pot filled with molten solder, at least partially removing the thimble from the solder pot, exposing at least two wires to molten solder within the thimble, and scraping dross off the thimble as the thimble is submerged in the solder pot.

The present invention will now be described, by way of example, with reference to the accompanying drawings, in which:

DESCRIPTION OF AN EMBODIMENT OF THE INVENTION

Figure 1:
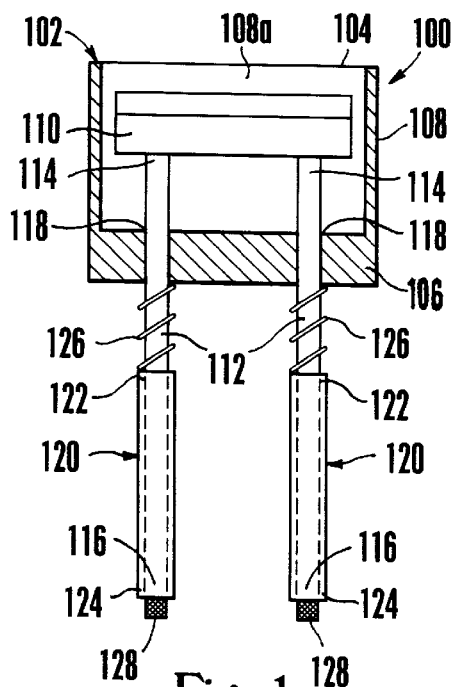
FIG. 1 is a front view of the self-cleaning soldering thimble assembly with the thimble shown in cross-section.
Figure 2:
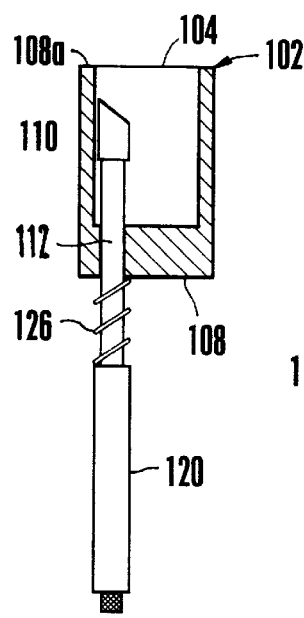
FIG. 2 is a side view of the self-cleaning soldering thimble assembly with the thimble shown in cross-section.
Figure 3:
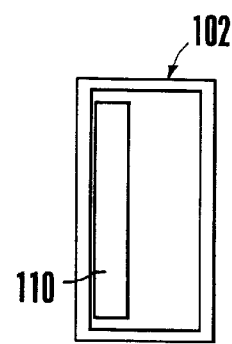
FIG. 3 is a top view of the self-cleaning soldering thimble assembly.

Referring initially to FIG. 1, a self-cleaning soldering thimble assembly is shown and generally designated 100. FIG. 1 shows that the self-cleaning soldering thimble assembly 100 includes a preferably metal, generally box-shaped thimble 102 having an open top 104, a closed bottom 106, and a continuous four-sided sidewall 108 therebetween. Disposed within the thimble 102 is a scraper 110 supported by two preferably metal, solid, generally cylindrical support rods 112. In a preferred embodiment, as shown in FIGS. 2 and 3, the scraper 110 is placed in close proximity to a side 108A of the continuous sidewall 108 on the top edge of which wires are disposed for soldering. The top of the scraper 110 is bevelled away from the side 108A.

Referring back to FIG. 1, each support rod 112 defines a top 114 and a bottom 116. The top 114 of each support rod 112 is attached to the bottom of the scraper 110. In a presently preferred embodiment, the scraper 110 is parallel to the bottom 106 of the thimble 102 and the support rods 112 are perpendicular to the scraper 110 and the container bottom 106.

FIG. 1 further shows that the bottom 106 of the thimble 102 is formed with two holes 118, and each hole 118 is sized to receive a respective support rod 112. Moreover, each support rod 112 can reciprocate within a hollow, generally cylindrical support rod sleeve 120 having a top 122 and bottom 124.

Still referring to FIG. 1, a coil spring 126 is disposed around each support rod 112, between the bottom 106 of the thimble 102 and the top 122 of a respective support rod sleeve 120. As described in detail below, the springs 126 bias the thimble away from the support rod sleeves 120. FIG. 1 also shows an adjusting mechanism, preferably a screw 128, installed in the bottom 124 of each support rod sleeve 120. The adjusting screws 128 can be used to fine-tune the height of the scraper 110 by urging against the support rods.

It is to be appreciated that the melting temperatures of the component parts of the self-cleaning soldering thimble assembly 100 are such that they are much greater than the melting temperature of solder. This will allow the self-cleaning soldering thimble assembly 100 to remain immersed in molten solder without being affected by the intense heat.

OPERATION

Figure 5:
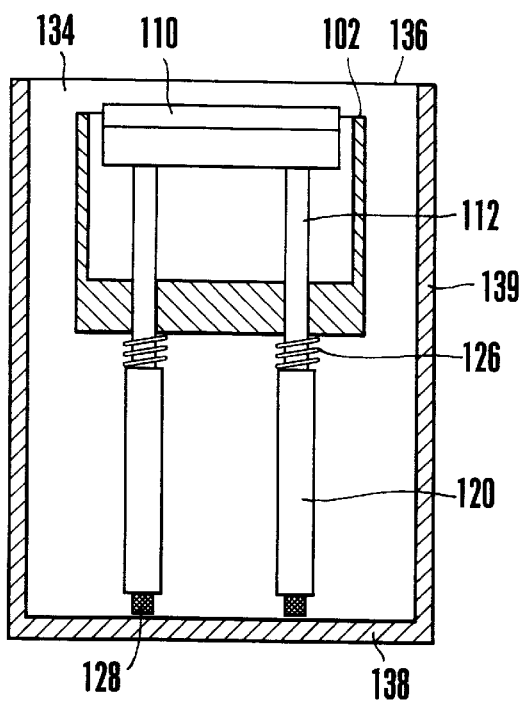
FIG. 5 is a front view of the self-cleaning soldering thimble assembly fully submerged in a solder pot with the thimble and the solder pot shown in cross-section.
Figure 4:
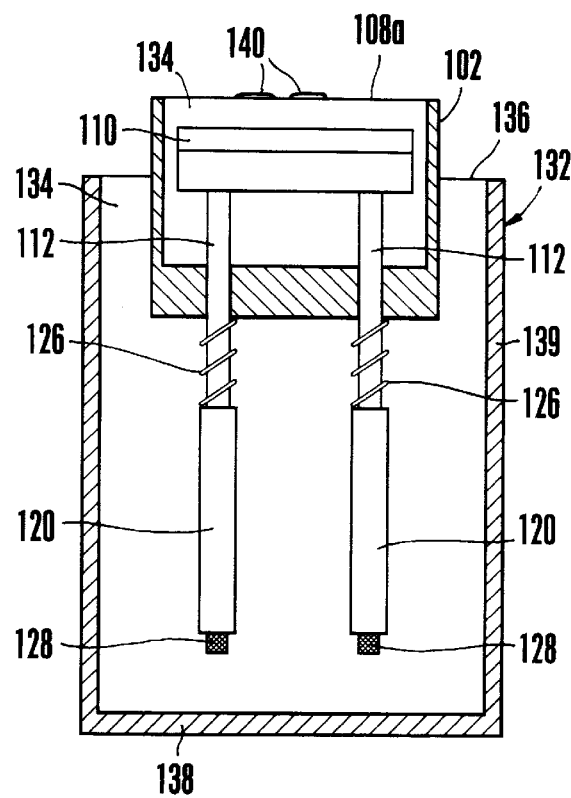
FIG. 4 is a front view of the self-cleaning soldering thimble assembly partially submerged in a solder pot with the thimble and the solder pot shown in cross-section.

Referring to FIGS. 4 and 5, the self-cleaning soldering thimble assembly 100 is shown reciprocably disposed within a hollow, generally box-shaped solder pot 132 filled with molten solder 134. The solder pot 132 includes an open top 136, a closed bottom 138, and a continuous four-sided sidewall 139 therebetween. The thimble assembly 100 is mounted to a bobbin mechanism (not shown) that moves the assembly 100 up and down in solder pot 132.

Referring specifically to FIG. 4, the self-cleaning soldering thimble assembly 100 is shown in a partially submerged configuration with the thimble 102 in the extended position. With the self-cleaning soldering thimble assembly 100 in this configuration, at least two wires (not shown) can be joined by disposing them across the top edge of the side 108A of the sidewall 108 of the thimble 102. This exposes the wires to the pool of molten solder 134 contained within the thimble 102. When the wires are removed, the self-cleaning soldering thimble assembly 100 moves to a fully submerged configuration, shown in FIG. 5, to refill the thimble 102 with solder 134 and to with remove any dross 140 along the top edge of the side 108A of the thimble 102.

More particularly, referring to FIG. 5, as the thimble assembly 100 moves downward relative to the solder pot 132 into the fully submerged configuration, the adjusting screws 128 come into contact with the bottom 138 of the solder pot 132. This contact stops any further downward motion of the adjusting screws 128, the support rod sleeves 120, the support rods 112, the scraper 110, and the support plate 128. The thimble 102, on the other hand, continues to move downward relative to the solder pot 132 into the retracted position in which the springs 126 are compressed.

When the thimble 102 reaches the fully retracted position, the scraper 110 moves up and beyond the top 104 of the thimble 102 against the side 108A to remove any dross 140 sticking to the top edge of the sidewall 108. With the configuration of structure described above, it is to be appreciated that the self-cleaning soldering thimble assembly 100 can automatically remove dross 140 along the top 104 of the thimble 102 as the thimble 102 is dipped into the solder pot 132 to refill the thimble 102 with solder 134.

While the particular self-cleaning soldering thimble assembly as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A method for joining two electrical conductors with molten solder comprising the acts of:
   submerging a thimble in a solder pot filled with molten solder;
   at least partially removing the thimble from the solder pot;
   exposing at least two wires to molten solder within the thimble; and
   scraping dross off the thimble as the thimble is submerged in the solder pot.

2. The method of a claim 1, further comprising the act of:
   providing a solder pot defining a top, a thimble disposed within the solder pot, the thimble defining a top, and a scraper disposed within the thimble, the thimble being movable between an extended position, wherein the scraper is distanced from the top of the thimble, and a retracted position, wherein the scraper extends beyond the top of the thimble to scrape dross therefrom.

3. The method of claim 2, further comprising the act of:
   moving the thimble between a partially submerged configuration, wherein the thimble is in the extended position and protrudes at least partially beyond the top of the solder pot, and a fully submerged configuration, wherein the thimble is in the retracted position and is submerged within the solder pot.

4. The method of claim 3, further comprising the act of:
   cooling a newly soldered electrical connection.

5. A self-cleaning soldering thimble assembly comprising:
   a thimble having at least one side, the thimble defining a top;
   a scraper closely spaced from the side such that it can scrape dross on the side as it moves along the side as the thimble is submerged in solder, the thimble being movable between an extended position, wherein the scraper is distanced from the top of the thimble, and a retracted position, wherein the scraper extends beyond the top of the thimble;
   at least one support rod attached to the scraper, the support rod supporting the scraper as the thimble moves relative to the scraper between the extended position and the retracted position;
   at least one support rod sleeve disposed around the support rod;
   at least one spring disposed around the support rod between the support rod sleeve and the thimble, the spring biasing the thimble toward the extended position; and at least one adjusting mechanism to adjust the height of the scraper relative to the thimble.

6. The thimble assembly of claim 5, further comprising a solder pot having a top, the thimble being movable between a partially submerged configuration, wherein the thimble is in the extended position and the thimble protrudes at least partially beyond the top of the solder pot, and a fully submerged configuration, wherein the thimble is in the retracted position and the thimble is disposed within the solder pot.

7. A soldering apparatus comprising:

a solder pot defining a top;

a thimble reciprocably disposed within the solder pot, the thimble defining a top;

a scraper disposed within the thimble, the thimble being movable between an extended position, wherein the scraper is distanced from the top of the thimble, and a retracted position, wherein the scraper extends beyond the top of the thimble to scrape dross therefrom when the thimble is submerged in the solder pot;

at least one support rod attached to the scraper, and the support rod supporting the scraper as the thimble moves relative to the scraper between the extended position and the retracted position;

at least one support rod sleeve disposed around the support rod;

at least one spring disposed around the support rod between the support rod sleeve and the thimble, the spring biasing the thimble toward the extended position; and at least one adjusting mechanism to adjust the height of the scraper relative to the thimble.

8. The soldering apparatus of claim 7, wherein the thimble is movable between a partially submerged configuration, wherein the thimble is in the extended position and protrudes at least partially beyond the top of the solder pot, and a fully submerged configuration, wherein the thimble is in the retracted position and is submerged within the solder pot.

* * * * *